US012114355B2

(12) United States Patent
Kwak et al.

(10) Patent No.: US 12,114,355 B2
(45) Date of Patent: Oct. 8, 2024

(54) UE CONFIGURED TO DETERMINE REMAINING CHANNEL OCCUPANCY FOR UL TRANSMISSION FOR SHARED-SPECTRUM CHANNEL ACCESS

(71) Applicant: Intel Corporation, Santa Clara, CA (US)

(72) Inventors: Yongjun Kwak, San Diego, CA (US); Lopamudra Kundu, Sunnyvale, CA (US); Salvatore Talarico, Los Gatos, CA (US); Yingyang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/234,697

(22) Filed: Aug. 16, 2023

(65) Prior Publication Data
US 2024/0008075 A1    Jan. 4, 2024

Related U.S. Application Data

(63) Continuation of application No. 17/061,122, filed on Oct. 1, 2020, now abandoned.
(Continued)

(51) Int. Cl.
*H04W 74/0808* (2024.01)
*H04W 16/14* (2009.01)
(Continued)

(52) U.S. Cl.
CPC ....... *H04W 74/0808* (2013.01); *H04W 16/14* (2013.01); *H04W 72/0453* (2013.01);
(Continued)

(58) Field of Classification Search
None
See application file for complete search history.

(56) References Cited

U.S. PATENT DOCUMENTS

| 2020/0236677 A1 | 7/2020 | Cui |
| 2020/0252948 A1 | 8/2020 | Cui |

(Continued)

OTHER PUBLICATIONS

"U.S.Appl. No. 17/061,122, Non Final Office Action mailed Jan. 19, 2023", 27 pgs.
(Continued)

*Primary Examiner* — Srinivasa R Reddivalam
(74) *Attorney, Agent, or Firm* — Schwegman Lundberg & Woessner, P.A.

(57) ABSTRACT

Systems and methods for downlink transmission using a wideband unlicensed band carrier in 5G networks are described. The gNB determines, based on LBT, which LBT subchannel(s) in a BWP are available during a COT. The gNB transmits an indication of the available subchannels in DCI format 2_0 of a GC-PDCCH of one of the available subchannels and subsequently transmits a PDSCH using the available subchannel(s). The gNB may configure multiple opportunities during the COT and transmit the GC-PDCCH after the initial opportunity. The PDSCH is transmitted on all available subchannels during the COT and, during an initial portion of the COT, may transmit the PDSCH by puncturing symbols of the unavailable subchannels. The indication may include a bitmap of available subchannels or if the LBT outcome is not available, may indicate all or none of the subchannels or available or that the outcome is not available.

20 Claims, 8 Drawing Sheets

Related U.S. Application Data

(60) Provisional application No. 62/911,908, filed on Oct. 7, 2019.

(51) Int. Cl.
*H04W 72/0453* (2023.01)
*H04W 72/23* (2023.01)
*H04W 72/53* (2023.01)
*H04W 76/27* (2018.01)

(52) U.S. Cl.
CPC ........... *H04W 72/23* (2023.01); *H04W 72/53* (2023.01); *H04W 76/27* (2018.02)

(56) References Cited

U.S. PATENT DOCUMENTS

| | | |
|---|---|---|
| 2021/0022181 A1 | 1/2021 | Kwak et al. |
| 2021/0076418 A1* | 3/2021 | Schober ................ H04L 5/0091 |
| 2021/0092622 A1 | 3/2021 | Tiirola et al. |
| 2022/0039158 A1 | 2/2022 | Awadin et al. |
| 2022/0210678 A1* | 6/2022 | Kim ........................ H04L 5/0094 |
| 2022/0346144 A1* | 10/2022 | Harada ................ H04L 5/0053 |
| 2022/0353894 A1* | 11/2022 | Nogami ................ H04L 5/0053 |

OTHER PUBLICATIONS

"U.S.Appl. No. 17/061,122, Notice of Allowance mailed Jul. 6, 2023", 8 pgs.

"U.S.Appl. No. 17/061,122, Response filed Apr. 19, 2023 to Non Final Office Action mailed Jan. 19, 2023", 11 pgs.

Fujitsu, "DL Signals and channels for NR-U", 3GPP TSG RAN WG1 #97, R1-1906431, (13th-17th, 2019), 4 pgs.

Fujitsu, "On wideband operation for NR-U", 3GPP TSG RAN WG1 #97, R1-1906435, (13th-17th, 2019), 4 pgs.

* cited by examiner

US 12,114,355 B2

UE CONFIGURED TO DETERMINE REMAINING CHANNEL OCCUPANCY FOR UL TRANSMISSION FOR SHARED-SPECTRUM CHANNEL ACCESS

PRIORITY CLAIM

This application is a continuation of U.S. patent application Ser. No. 17/061,122, filed Oct. 1, 2022, which claims the benefit of priority under 35 USC 119(e) to U.S. Provisional Patent Application Ser. No. 62/911,908, filed Oct. 7, 2019, each of which is incorporated herein by reference in its entirety.

TECHNICAL FIELD

Embodiments pertain to new radio (NR)/fifth generation (5G) systems. Some embodiments relate to unlicensed band (NR-U) use in NR systems. Some embodiments relate to downlink NR-U operation and, in particular, wideband NR-U operation.

BACKGROUND

The use of various types of communication systems such as 3GPP networks, has increased due to both an increase in the types of devices user equipment (UEs) using network resources as well as the amount of data and bandwidth being used by various applications, such as video streaming, operating on these UEs. The next generation wireless communication system will provide ubiquitous connectivity and access to information, as well as ability to share data, by various users and applications. NR systems are expected to have a unified framework in which different and conflicting performance criteria and services are to be met. In general, NR systems will evolve based on 3GPP LTE-Advanced technology with additional enhanced radio access technologies (RATs) to enable seamless wireless connectivity solutions. An increasing number of these solutions involve the issue of the massive increase in number of UEs in use. In particular, a number of developments have focused on the use of the unlicensed spectrum to provide additional communication channels with which the base stations (gNBs) and UEs communicate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
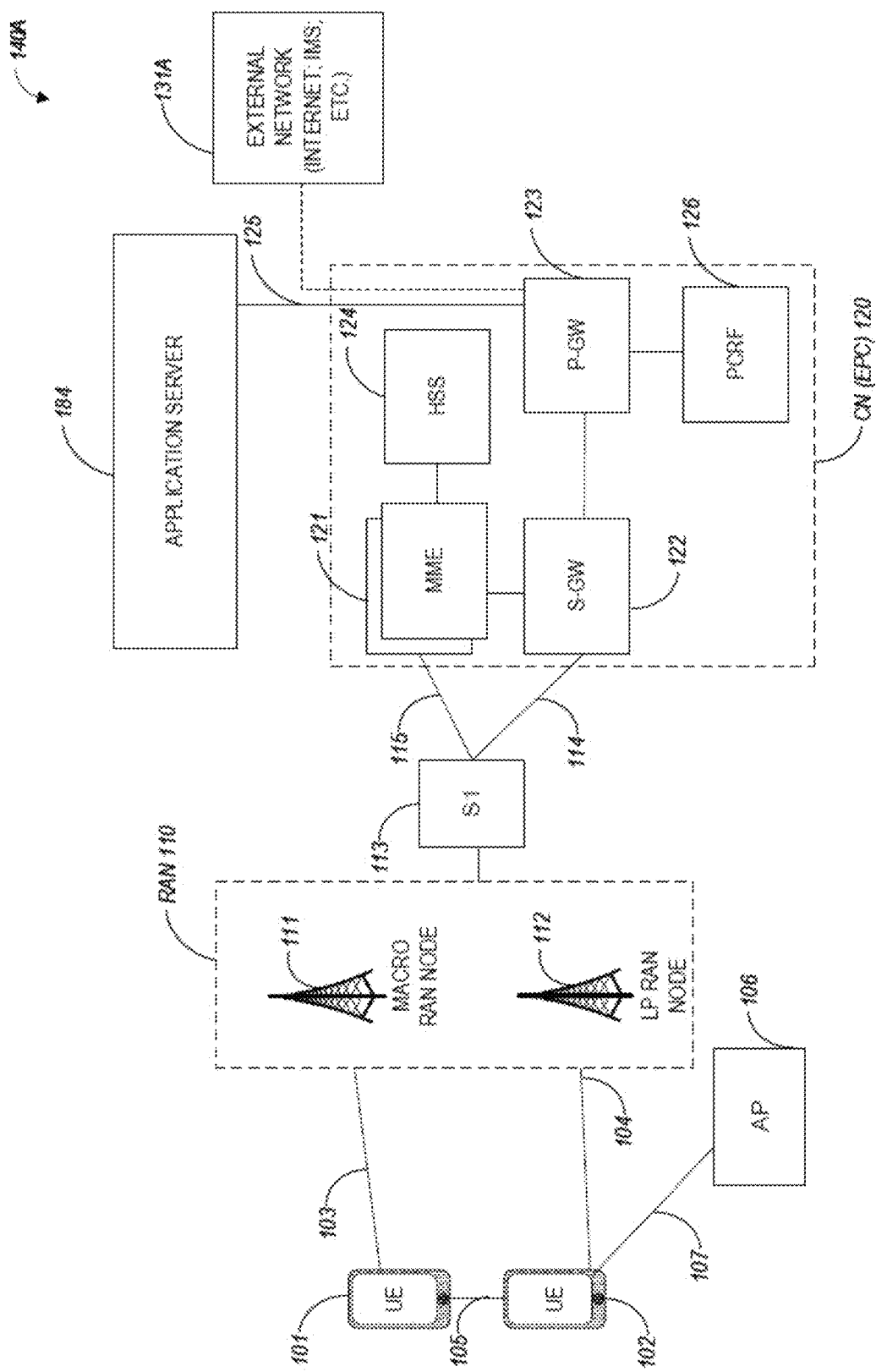
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the core network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
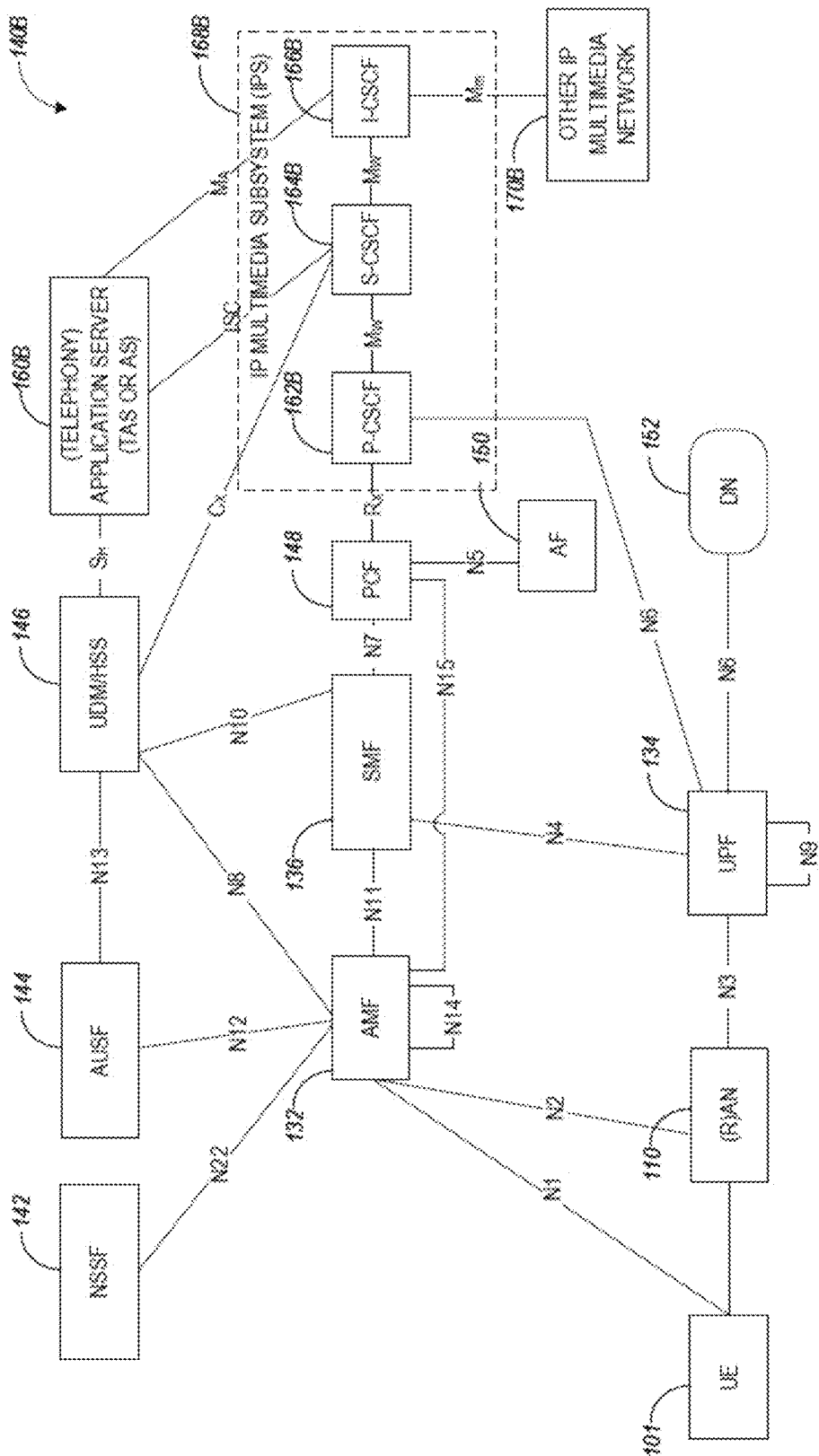
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
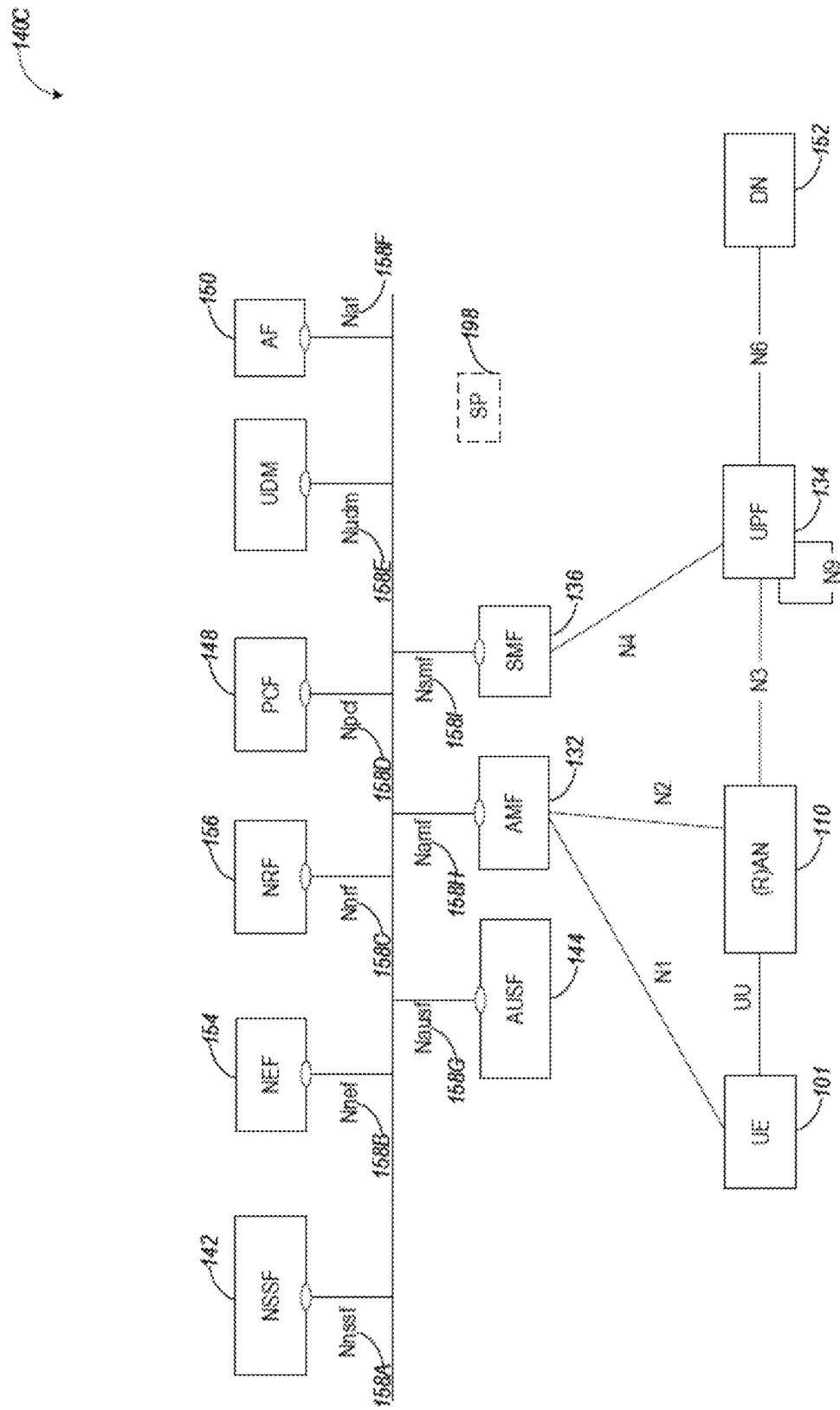
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
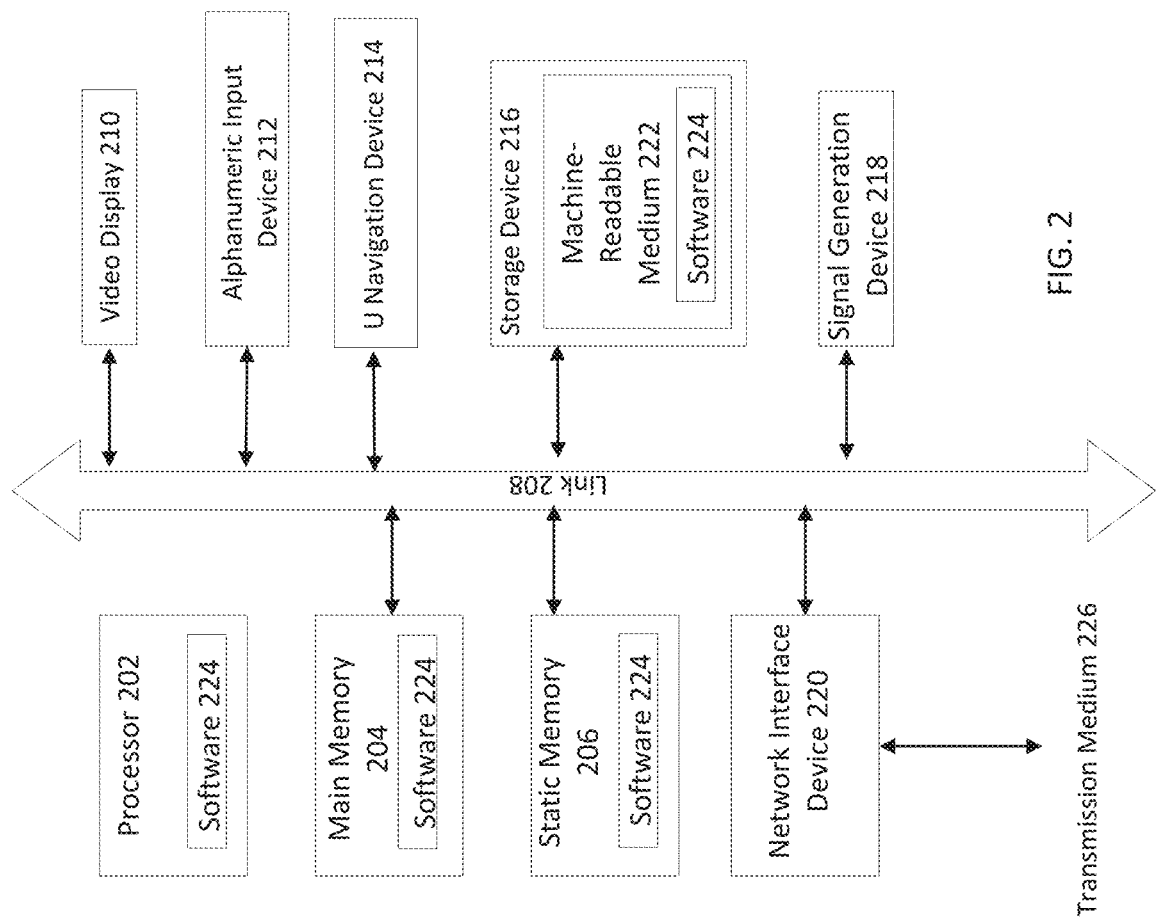
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1A.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As indicated above, the explosion of network use and the relative paucity of spectrum has engendered the expansion of LTE communications into the unlicensed spectrum via Licensed Assisted Access (LAA) or other mechanisms. One consideration for LTE to operate in unlicensed spectrum is to ensure fair co-existence with incumbent systems like networks WLANs. For example, it is desirable to minimize design efforts by identifying enhancements for Rel-15 NR design to enable unlicensed operation, while avoiding divergence from Rel-15 NR licensed framework. It is desirable to use coexistence methods already defined for LTE-based LAA context as the baseline for the operation of NR-unlicensed systems, while enhancements over these existing methods are not precluded. It is also desirable for NR-based operation in the unlicensed spectrum to not impact deployed Wi-Fi services (data, video and voice services) more than an additional WiFi network on the same carrier.

NR-unlicensed technologies can be categorized into different modes including Carrier Aggregation (CA), Dual Connectivity (DC), and Standalone (SA) modes of network operation. The channel access mechanism aspect is one of the building blocks for NR-unlicensed used for any deployment options. The use of the listen-before-talk (LBT) mechanism in the LTE-based LAA system enables fair coexistence to be achieved with the neighboring systems sharing the unlicensed spectrum in addition to fulfilling regulatory requirements. The LBT-based channel access mechanism resembles the WLAN's Carrier Sense Multiple Access/Certification Authority (CSMA/CA) principles. Any node that intends to transmit in the unlicensed spectrum first performs a channel sensing operation before initiating any transmission. An additional random back-off mechanism is adopted to avoid collisions when more than one node senses the channel as idle and transmits simultaneously.

In NR-U, one cell can have a carrier bandwidth (BW) larger than 20 MHz (like NR wideband operation). However, due to licensed band restrictions, the LBT is performed based on a 20 MHz subband, which is called the LBT BW. Since there can be multiple LBT BWs inside one cell for wideband operation, the operation may depend on how many LBT BWs are available to be used by performing separate LBT operations. Thus, wideband operation may be defined as: wideband (in integer multiples of 20 MHz) for DL and UL for NR-U supported with multiple serving cells, and wideband operation (in integer multiples of 20 MHz) for DL and UL for NR-U supported with one serving cell with bandwidth >20 MHz with a potential scheduling constraint subject to input from RAN2 and RAN4 on feasibility of operating the wideband carrier when LBT is unsuccessful in one or more LBT bandwidths (also referred to as LBT subchannels) within the wideband carrier. For all wideband operation cases, clear channel assessment (CCA) is performed in units of 20 MHz (at least for 5 GHz).

A mechanism to operate wideband cells, and in particular, wideband operation for NR-U is disclosed. The embodiments herein provide more accurate and efficient operation of wideband procedures with LBT operation as compared with existing/previous solutions.

Mechanisms to Operate Downlink Transmission for Wideband Cell

Figure 3:
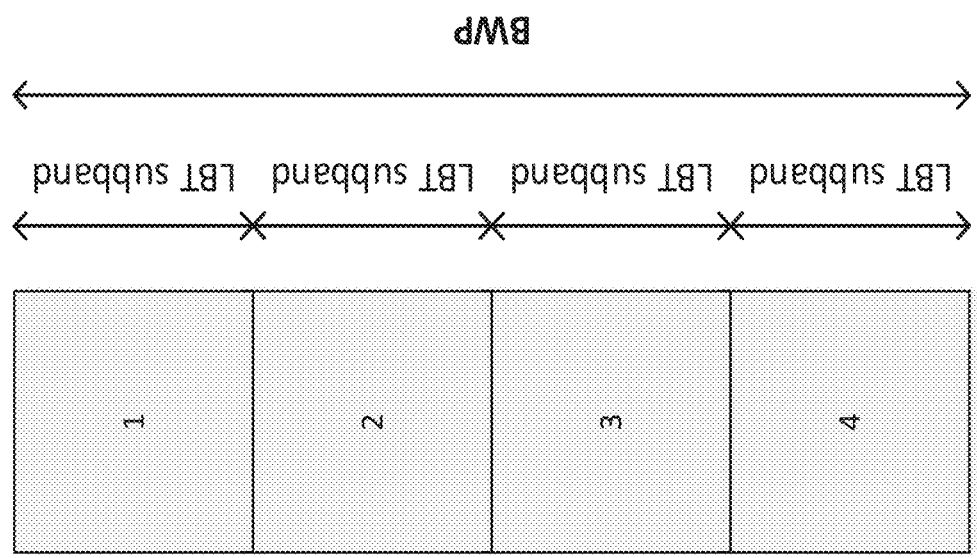
FIG. 3 illustrates a wideband configuration in accordance with some embodiments.

FIG. 3 shows an example wideband configuration in accordance with some embodiments. In FIG. 3, one active bandwidth part (BWP) is configured for a UE, in which the BWP is larger than the LBT subband width of 20 MHz. Thus, inside the active BWP, there can be multiple (for example, 4 LBT BWs as shown) LBT BWs. Here, the terminology of "LBT subband" can be also used instead of "LBT bandwidth," "LBT BW," or the like.

Wideband operation depends on how many LBT BWs are available to be used due to successful LBT outcomes. For DL WB operation, multiple options are given below: Option 1a: Multiple BWPs configured, multiple BWPs activated, transmission of a physical downlink shared channel (PDSCH) on one or more BWPs. Option 1b: Multiple BWPs configured, multiple BWPs activated, transmission of the PDSCH on a single BWP. Option 2: Multiple BWPs can be configured, a single BWP is activated, the gNB transmits the PDSCH on a single BWP if the CCA is successful at the gNB for the whole BWP. Option 3: Multiple BWPs can be configured, a single BWP is activated, the gNB transmits the PDSCH on parts or whole of a single BWP where the CCA is successful at the gNB.

Option 1a and 1b each use multiple active BWPs but option 2 and 3 can operate under a single active BWP. The main difference between option 2 and option 3 is the condition of the PDSCH transmissions. For option 2, the PDSCH can be transmitted over the whole BWP if the CCA is successful for all LBT BWs. For option 3, the PDSCH can be transmitted over the part of the BWP where the CCA is successful. For option 2, if any of the LBT BWs fails the CCA, then nothing is transmitted in the DL. However, for option 3, the available subbands for PDSCH transmission depend on the CCA of each LBT BW. Also, if one or more LBT BW fail the CCA inside the BWP, interference from the device using the subband may bleed into the adjacent LBT BW. Therefore, a guard band may be used for the edge of the available subbands for option 3.

Indication of Available LBT BW

A mechanism for the UE to detect whether a gNB is transmitting across multiple carriers or multiple LBT BWs in a carrier may be supported. It may thus be desirable to explicitly indicate the gNB's transmitted LBT BWs to the UEs since blind detection of available LBT BWs may not be sufficiently reliable and can lead to excessive operation when errors occur. Furthermore, the UE blind detection itself may bring additional implementation burdens. In some embodiments, downlink control information (DCI) format 2_0/group common physical downlink control channel (GC-PDCCH) may be used to indicate a Channel Occupancy Time (COT) structure.

In particular, the GC-PDCCH is used to carry at least slot format related information. DCI format 2_0 is used for notifying the slot format. DCI format 2_0 with a cyclic redundancy check (CRC) scrambled by the Slot format indication Radio Network Temporary Identifier (SFI-RNTI) includes 1-N slot indicators (e.g., Slot format indicator 1, Slot format indicator 2, . . . , Slot format indicator N) where N is a number. The size of DCI format 2_0 is configurable by higher layers up to 128 bits, according to subclause 11.1.1 of 3GPP TS 38.213. In various embodiments, DCI format 2_0 also carries an indication of the COT structure in the time domain.

In some embodiments, DCI format 2_0 is used for the available LBT BW information (frequency domain COT structure) as well as the time domain COT structure. If the available LBT BW information is transmitted in DCI format 2_0 via the GC-PDCCH, clarification may be used regarding the LBT BW in which the GC-PDCCH is transmitted since there are some LBT BWs that are available and remaining LBT BWs are not available for the transmission of the GC-PDCCH. It may be assumed that each LBT BW includes at least one Control Resource Set (CORESET) and it can be assumed that at least one PDCCH candidate for the GC-PDCCH is configured for each LBT BW. In these embodiments, the gNB transmits the GC-PDCCH in one of the PDCCH candidates, which is positioned within available LBT BW.

Figure 4:
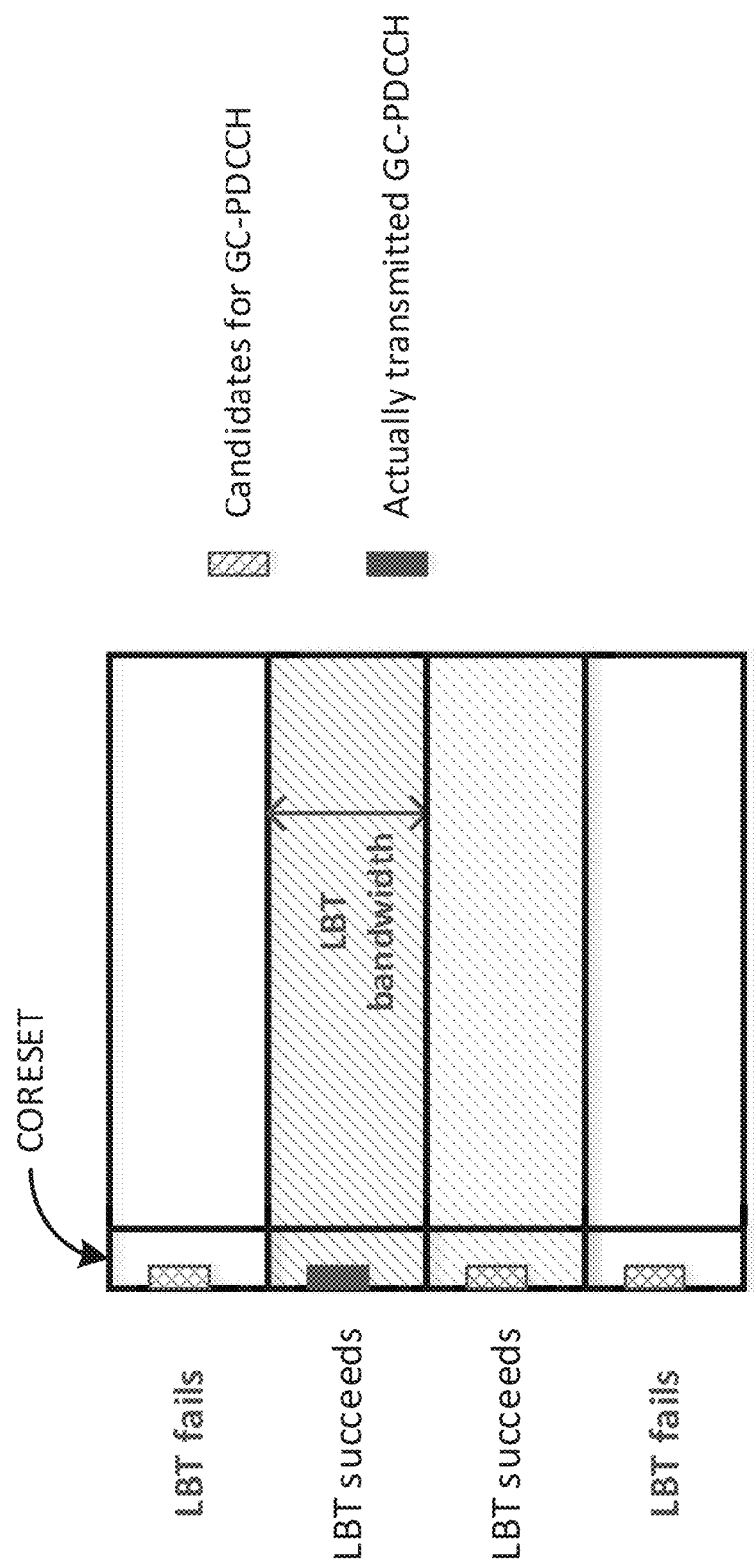
FIG. 4 illustrates a group common physical downlink control channel (GC-PDCCH) transmission in accordance with some embodiments.

FIG. 4 illustrates a GC-PDCCH transmission in accordance with some embodiments. As shown in FIG. 4, the GC-PDCCH is transmitted in only one of the candidates. FIG. 4 illustrates an example in which LBT fails in one or more of the LBT BWs and succeeds in one or more others of the LBT BWs (including the LBT BW in which the GC-PDCCH is transmitted).

In some embodiments, for a CA scenario between the licensed band and unlicensed band (e.g., a LAA scenario), it is also possible to transmit the GC-PDCCH using the licensed band in order not to configure multiple PDCCH candidates for the GC-PDCCH and to provide higher reliability for the GC-PDCCH transmission.

If the indication is supported in the DCI format 2_0 via GC-PDCCH in one of the available LBT BWs, additional procedures can be defined, such as those discussed below.

In one embodiment, for the configuration of a CORESET that corresponds to the GC-PDCCH, a cluster-based configuration may be supported. In a cluster-based configuration, the CORESET resources may be split for each LBT BW, and each LBT BW may have a part of a CORESET resource. This permits at least some PDCCH candidates to be confined within each LBT BW. Therefore, even though a single CORESET is configured, the GC-PDCCH can be transmitted using the PDCCH candidate confined to the LBT BW in which LBT is successful.

In one embodiment, for a cluster-based configuration, it may be desirable for at least one PDCCH candidate to be guaranteed considering only one single LBT BW is available by LBT outputs. Therefore, the number of PDCCH candidates per each aggregation level of the PDCCH may be at least equal to the number of LBT BWs. As shown below as an example, for DCI 2_0, the number of PDCCH candidates may be 5 considering 5 LBT BWS in a 100 MHz BW carrier.

```
dci-Format2-0                    SEQUENCE {
    nrofCandidates-SFI             SEQUENCE {
        aggregationLevel1            ENUMERATED {n1, n2, n3, n4, n5}
        OPTIONAL,  -- Need R
        aggregationLevel2            ENUMERATED { n1, n2, n3, n4, n5}
        OPTIONAL,  -- Need R
        aggregationLevel4            ENUMERATED { n1, n2, n3, n4, n5}
        OPTIONAL,  -- Need R
        aggregationLevel8            ENUMERATED { n1, n2, n3, n4, n5}
        OPTIONAL,  -- Need R
        aggregationLevel16           ENUMERATED { n1, n2, n3, n4, n5}
        OPTIONAL   -- Need R
        },
        ...
    }
    OPTIONAL,  -- Need R
```

Figure 5:
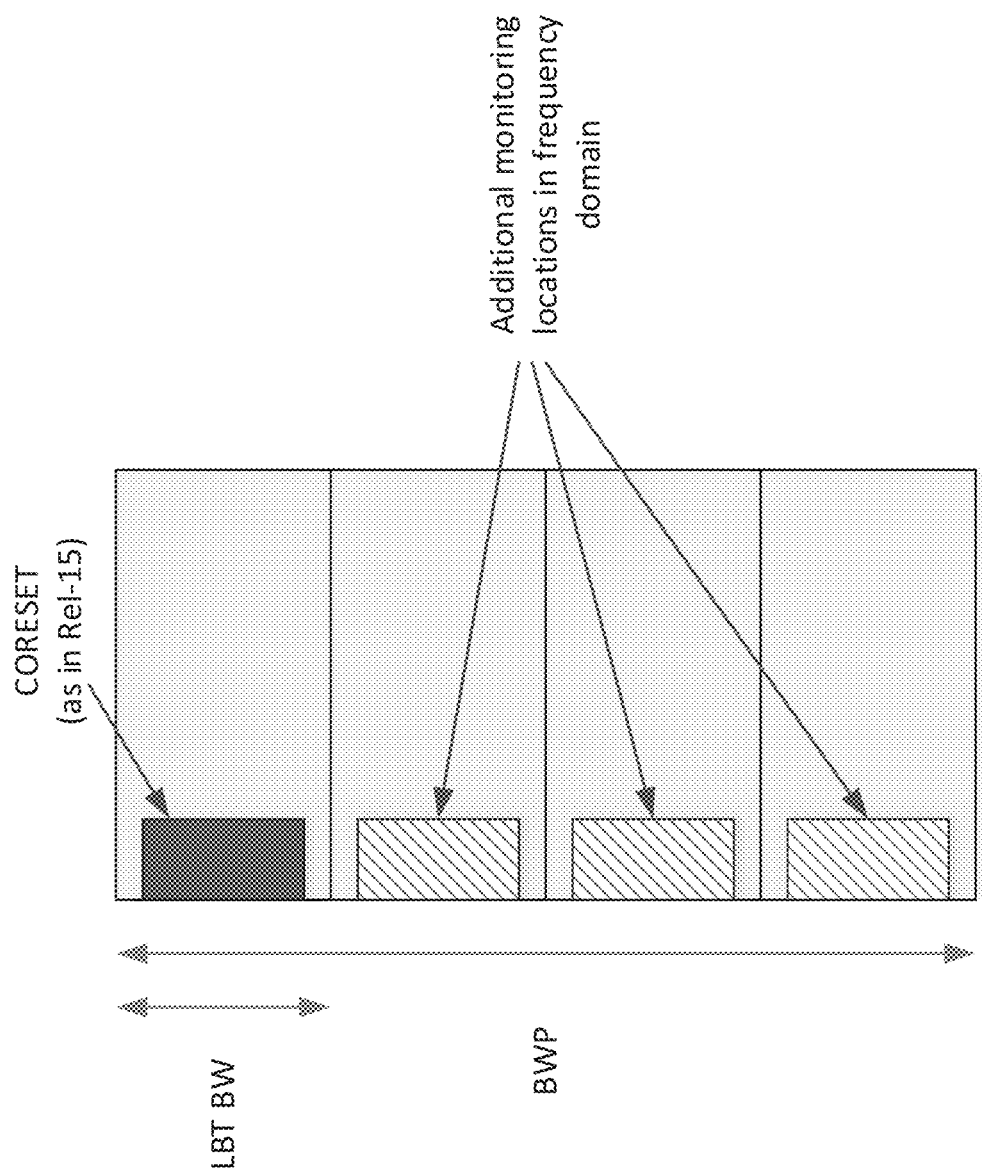
FIG. 5 illustrates monitoring locations for the same Control Resource Set (CORESET) in accordance with some embodiments.

In one embodiment, for the case where a CORESET is confined within an LBT bandwidth, the search space set configuration associated with the CORESET can have multiple monitoring locations in the frequency domain (per LBT bandwidth). FIG. 5 illustrates monitoring locations for the same CORESET in accordance with some embodiments. FIG. 5 thus shows how CORESET can be configured with the agreement, where one CORESET is configured as in Rel-15 with the restriction that CORESET spans inside a single LBT BW and additional monitoring locations with the same CORESET properties except frequency locations are configured in search space. In order to support multiple monitoring locations in the frequency domain, the following options for RRC parameters can be considered.

Option 1) a parameter (monitoringSubband-r16) may be introduced in the Radio Resource Control (RRC) Searchspace information element (IE). The monitoringSubband-r16 parameter shows which LBT subband is to be monitored inside multiple LBT subbands and only one CORESET is configured for a single LBT subband. A bitmap is used for monitoringSubband-r16 and each bit of the bitmap may correspond to one LBT subband, where Max_Subband is the number of LBT subbands that can be configured. The corresponding RRC parameters are shown below.

```
-- ASN1START
-- TAG-SEARCHSPACE-START
SearchSpace ::=                         SEQUENCE {
  searchSpaceId                         SearchSpaceId,
  control ResourceSetId                 Control ResourceSetId           OPTIONAL,
-- Cond SetupOnly
  monitoringSlotPeriodicityAndOffset    CHOICE {
    sl1                                 NULL,
    sl2                                     INTEGER (0..1),
    sl4                                     INTEGER (0..3),
    sl5                                     INTEGER (0..4),
    sl8                                     INTEGER (0..7),
    sl10                                INTEGER (0..9),
    sl16                                INTEGER (0..15),
    sl20                                INTEGER (0..19),
    sl40                                INTEGER (0..39),
    sl80                                INTEGER (0..79),
    sl160                               INTEGER (0. . 159),
    sl320                               INTEGER (0..319),
    sl640                               INTEGER (0..639),
    sl1280                              INTEGER (0..1279),
    sl2560                              INTEGER (0..2559)
  }                                                                     OPTIONAL,
Cond Setup
  Duration                              INTEGER (2..2559)       OPTIONAL,
Need R
  monitoringSymbolsWithinSlot           BIT STRING (SIZE (14) )         OPTIONAL,
-- Cond Setup
  nrofCandidates                        SEQUENCE {
    aggregationLevel1                       ENUMERATED {n0, n1, n2,
n3, n4, n5, n6, n8},
    aggregationLevel2                       ENUMERATED {n0, n1, n2,
n3, n4, n5, n6, n8},
    aggregationLevel4                       ENUMERATED {n0, n1, n2,
n3, n4, n5, n6, n8},
    aggregationLevel8                       ENUMERATED {n0, n1, n2,
n3, n4, n5, n6, n8} ,
    aggregationLevel16                      ENUMERATED {n0, n1, n2,
n3, n4, n5, n6, n8}                                                     OPTIONAL,
  }
Cond Setup
  monitoringSubband-r16                 BIT STRING (SIZE
(2. . MAX_Subband) )
  searchSpaceType                       CHOICE {
    common                              SEQUENCE {
      dci-Format0-0-AndFormat1-0            SEQUENCE {
        ...
      }                                                                 OPTIONAL,
Need R
      dci-Format2-0                         SEQUENCE {
        nrofCandidates-SFI                      SEQUENCE {
          aggregationLevel1                         ENUMERATED {n1, n2}
OPTIONAL,   -- Need R
          aggregationLevel2                         ENUMERATED {n1, n2}
OPTIONAL,   -- Need R
          aggregationLevel4                         ENUMERATED {n1, n2}
OPTIONAL,   --Need R
          aggregationLevel8                         ENUMERATED {n1, n2}
OPTIONAL,   -- Need R
          aggregationLevel16                            ENUMERATED {n1,
n2} OPTIONAL   -- Need R
        },
        ...
      }                                                                 OPTIONAL,
Need R
      dci-Format2-1                         SEQUENCE {
        ...
      }                                                                 OPTIONAL,
Need R
      dci-Format2-1                         SEQUENCE {
        ...
      }                                                                 OPTIONAL,
Need R
      dci-Format2-3                         SEQUENCE {
        dummy 1                                 ENUMERATED {sl1, sl2, sl4, sl5,
sl8, sl10, sl16, sl20}  OPTIONAL,  -- Cond Setup
        dummy2                                  ENUMERATED {n1, n2},
        ...
      }                                                                 OPTIONAL
Need R
    },
```

```
    ue-Specific                         SEQUENCE {
        dci-Formats                     ENUMERATED
{formats0-0-And-1-0, formats0-1-And-1-1},
        ...
        }
    }
-- Cond Setup
}
-- TAG-SEARCHSPACE-STOP
-- ASN1STOP
```

Option 2) the monitoringSubband-r16 parameter may be introduced in the RRC Searchspace IE. The monitoringSubband-r16 parameter shows which LBT subband is to be monitored inside multiple LBT subbands and only one CORESET is configured for a single LBT subband. A bitmap is used for monitoringSubband-r16 but, unlike option 1, each bit of the bitmap corresponds to 6 physical resource blocks (PRBs), which is the unit of CORESET. Each bit of the bitmap indicates the starting point of the CORESET that is to be monitored. The corresponding RRC parameters are shown below.

```
-- ASN1START
-- TAG-SEARCHSPACE-START
SearchSpace ::=                         SEQUENCE {
    searchSpaceId                       SearchSpaceId,
    control ResourceSetId               ControlResourceSetId
    OPTIONAL,    -- Cond SetupOnly
    monitoringSlotPeriodicityAndOffset  CHOICE {
        s11                                 NULL,
        s12                                 INTEGER (0..1),
        s14                                 INTEGER (0..3),
        s15                                 INTEGER (0..4),
        s18                                 INTEGER (0..7),
        s110                                INTEGER (0..9) ,
        s116                                INTEGER (0..15),
        s120                                INTEGER (0..19),
        s140                                INTEGER (0..39) ,
        s180                                INTEGER (0..79) ,
        s1160                               INTEGER (0. . 159) ,
        s1320                               INTEGER (0..319) ,
        s1640                               INTEGER (0. . 639) ,
        s11280                              INTEGER (0. . 1279) ,
        s12560                              INTEGER (0. . 2559)
        }
    OPTIONAL,    -- Cond Setup
    duration                            INTEGER (2..2559)
    OPTIONAL,    --Need R
    monitoringSymbolsWithinSlot         BIT STRING (SIZE (14) )
    OPTIONAL, -- Cond Setup
    nrofCandidates                      SEQUENCE {
        aggregationLevel1                   ENUMERATED {n0, n1, n2,
n3, n4, n5, n6, n8},
        aggregationLevel2                   ENUMERATED {n0, n1, n2,
n3, n4, n5, n6, n8},
        aggregationLevel4                   ENUMERATED {n0, n1, n2,
n3, n4, n5, n6, n8},
        aggregationLevel8                   ENUMERATED {n0, n1, n2,
n3, n4, n5, n6, n8 },
        aggregationLevel16                  ENUMERATED {n0, n1, n2,
n3, n4, n5, n6, n8 }
        }
    OPTIONAL,  -- Cond Setup
    monitoringSubband-r16               BIT STRING ( size(45) )
    searchSpaceType                     CHOICE {
        common                          SEQUENCE {
            dci-Format0-0-AndFormat1-0      SEQUENCE {
                ...
            }
    OPTIONAL,  -- Need R
            dci-Format2-0                   SEQUENCE {
                nrofCandidates-SFI              SEQUENCE {
                    aggregationLevel1               ENUMERATED {n1, n2}
```

```
OPTIONAL,  -- Need R
        aggregationLevel2        ENUMERATED {n1, n2}
OPTIONAL,  -- Need R
        aggregationLevel4        ENUMERATED {n1, n2}
OPTIONAL,  --Need R
        aggregationLevel8        ENUMERATED {n1, n2}
OPTIONAL,  -- Need R
        aggregationLevel16       ENUMERATED {n1, n2}
OPTIONAL -- Need R
    },
    ...
    }
OPTIONAL,  -- Need R
    dci-Format2-1                SEQUENCE {
    ...
    }
OPTIONAL,  -- Need R
    dci-Format2-2                SEQUENCE {
    ...
    }
OPTIONAL,  -- Need R
    dci-Format2-3                SEQUENCE {
        dummy 1                  ENUMERATED {s11, s12,
s14, s15, s18, s110,
        s116, s120}  OPTIONAL,   -- Cond Setup
        dummy2                   ENUMERATED {n1, n2},
    ...
    }                                                OPTIONAL
-- Need R
    },
    ue-Specific                  SEQUENCE {
        dci-Formats              ENUMERATED {formats0-0-And-1-
0, formats0-1-And-1-1},
    ...
    }
    }                                                OPTIONAL
-- Cond Setup
}
-- TAG-SEARCHSPACE-STOP
-- ASN1STOP
```

Option 3) the monitoringSubband-r16 parameter may be introduced in the RRC Searchspace IE. The monitoringSubband-r16 parameter shows which LBT subband is to be monitored inside multiple LBT subbands and only one CORESET is configured for a single LBT subband. A bitmap is used for monitoringSubband-r16 but, unlike option 1, multiple offset values are indicated by monitoringSubband-r16 and each offset indicates the offset of additional monitoring locations in the frequency domain with respect to the original CORESET. The corresponding RRC parameters are shown below.

```
-- ASN1START
-- TAG-SEARCHSPACE-START
SearchSpace ::=                  SEQUENCE {
    searchSpaceId                SearchSpaceId,
    control ResourceSetId        ControlResourceSetId
OPTIONAL,  -- Cond SetupOnly
    monitoringSlotPeriodicityAndOffset   CHOICE {
        s11                      NULL,
        s12                      INTEGER (0..1),
        s14                      INTEGER (0..3),
        s15                      INTEGER (0..4),
        s18                      INTEGER (0..7),
        s110                     INTEGER (0..9),
        s116                     INTEGER (0..15),
        s120                     INTEGER (0..19),
        s140                     INTEGER (0..39),
        s180                     INTEGER (0..79),
        s1160                    INTEGER (0..159),
        s1320                    INTEGER (0..319),
        s1640                    INTEGER (0..639),
        s11280                   INTEGER (0..1279),
```

```
        s12560                       INTEGER (0..2559)
    }                                              OPTIONAL,
-- Cond Setup
    duration                         INTEGER (2..2559)
OPTIONAL,   -- Need R
    monitoringSymbolsWithinSlot      BIT STRING (SIZE (14) )
OPTIONAL,   -- Cond Setup
    nrofCandidates                   SEQUENCE {
        aggregationLevel1                ENUMERATED {n0, n1, n2,
n3, n4, n5, n6, n8},
        aggregationLevel2                ENUMERATED {n0, n1, n2,
n3, n4, n5, n6, n8},
        aggregationLevel4                ENUMERATED {n0, n1, n2,
n3, n4, n5, n6, n8 },
        aggregationLevel8                ENUMERATED {n0, n1, n2,
n3, n4, n5, n6, n8 },
        aggregationLevel16               ENUMERATED {n0, n1, n2,
n3, n4, n5, n6, n8 }
    }                                              OPTIONAL,
-- Cond Setup
    monitoringSubbandOffset-r16      SEQUENCE (SIZE (1..5) ) OF
INTEGER (0..45)
    searchSpaceType                  CHOICE {
        common                           SEQUENCE {
            dci-Format0-0-AndFormat1-0       SEQUENCE {
                ...
            }                                          OPTIONAL,
-- Need R
            dci-Format2-0                    SEQUENCE {
                nrofCandidates-SFI               SEQUENCE {
                    aggregationLevel1                ENUMERATED {n1, n2}
OPTIONAL,   -- Need R
                    aggregationLevel2                ENUMERATED {n1, n2}
OPTIONAL,   -- Need R
                    aggregationLevel4                ENUMERATED {n1, n2}
OPTIONAL,   -- Need R
                    aggregationLevel8                ENUMERATED {n1, n2}
OPTIONAL,   -- Need R
                    aggregationLevel16               ENUMERATED {n1, n2}
OPTIONAL    -- Need R
                },
                ...
            }                                          OPTIONAL,
-- Need R
            dci-Format2-1                    SEQUENCE {
                ...
            }                                          OPTIONAL,
-- Need R
            dci-Format2-2                    SEQUENCE {
                ...
            }                                          OPTIONAL,
-- Need R
            dci-Format2-3                    SEQUENCE {
                dummy1                           ENUMERATED { s11, s12,
s14, s15, s18, s110,
    s116, s120} OPTIONAL,   -- Cond Setup
                dummy2                           ENUMERATED {n1, n2},
                ...
            }                                          OPTIONAL
-- Need R
        },
        ue-Specific                      SEQUENCE {
            dci-Formats                      ENUMERATED {formats0-
0-And-1-0, formats0-1-
    And-1-1},
            ...
        }
    }                                              OPTIONAL
-- Cond Setup
}
-- TAG-SEARCHSPACE-STOP
-- ASN1STOP
```

In one embodiment, based on gNB implementation, the GC-PDCCH may not be prepared at the beginning of the gNB-acquired COT. In that case, in some embodiments, the GC-PDCCH may be transmitted in the next monitoring occasions of the GC-PDCCH. Therefore, in these embodiments, the gNB may configure multiple monitoring opportunities for the GC-PDCCH inside the COT. In different embodiments, the GC-PDCCH may be transmitted at the beginning and/or middle of the COT (the GC-PDCCH may be transmitted a single time during the COT or multiple times inside of the COT).

Figure 6:
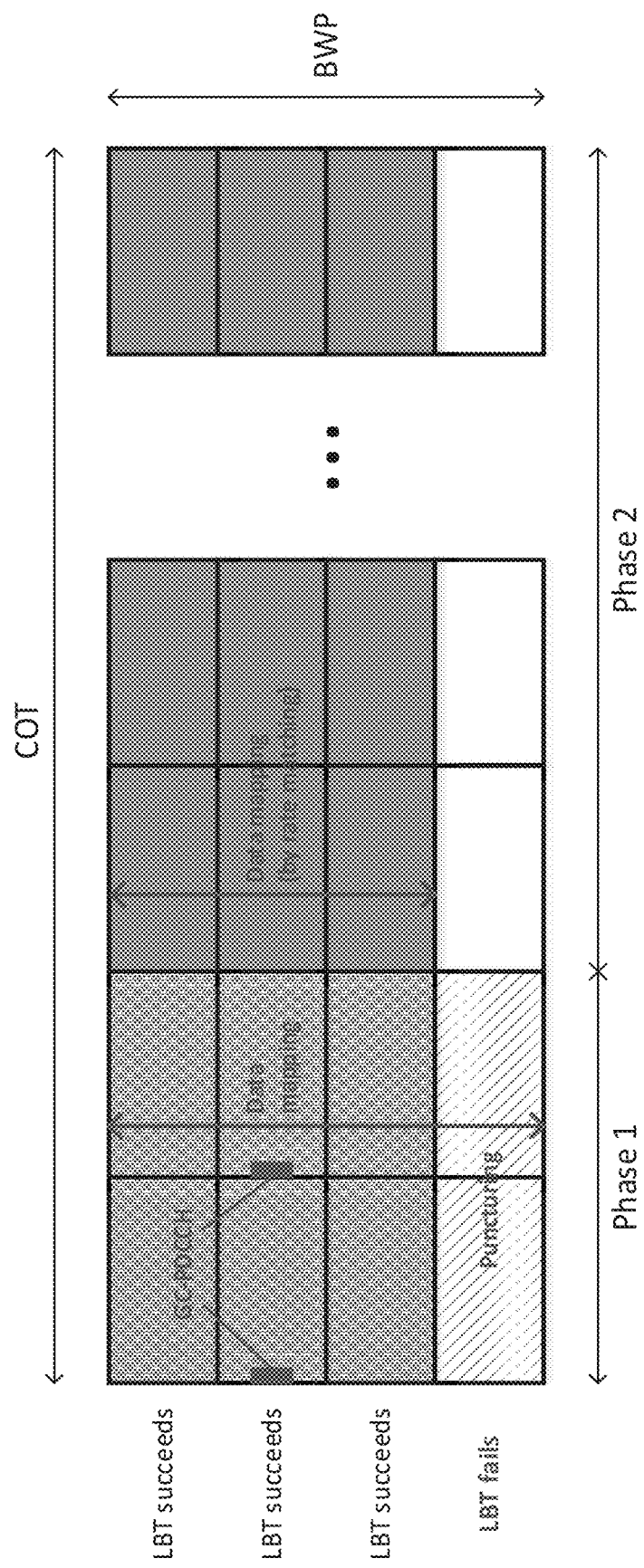
FIG. 6 illustrates physical downlink shared channel (PDSCH) adjustment based on listen-before-talk (LBT) outcome in accordance with some embodiments.

FIG. 6 illustrates PDSCH adjustment based on LBT outcome in accordance with some embodiments. In another embodiment, reformatting of the PDSCH based on the LBT outcomes may be problematic. Therefore, in some embodiments as shown in FIG. 6, in the first one or a few slots (phase 1), the PDSCH may be mapped assuming that the entire BWP is available and the gNB may puncture the LBT BW where CCA is not successful. After a sufficient amount of time, the gNB can adjust the PDSCH according to the available LBT BWs in the remaining time of the same COT (phase 2) as shown.

The UE may try to receive whole BW during phase 1, per FIG. 6. In such an embodiment however, the UE may try to blindly detect which LBT BWs are available using demodulation reference signals (DMRS) or try to decode the GC-PDCCH as fast as possible and perform the decoding using the knowledge of the punctured parts. In some embodiments, during Phase 2, the UE knows which LBT BWs are available and performs rate matching around the unavailable LBT BW (unavailable due to LBT failure).

In one embodiment, the DCI 2_0 includes the available LBT bandwidth information as a bitmap of N bits, where N is the same as the number of LBT bandwidth (20 MHz) and each bit of the bitmap indicates whether or not the LBT is successful in the corresponding LBT bandwidth.

In one embodiment, DCI 2_0 includes the available LBT bandwidth information as N bits, where N is able to indicate any combination of the available LBT bandwidths inside the carrier. In various embodiments, if the LBT outcome is not available due to the time constraint, the gNB can indicate that all LBT bandwidths are available, the gNB can indicate that the LBT outcome is not available yet by reserving 1 state of the N, or the gNB can indicate that all LBT bandwidths are not available. In another embodiment, the available LBT bandwidth information may be configured by higher layer signaling, e.g., the kind of combination of available LBT BW may be indicated.

In other embodiments, for the transmission of the physical uplink shared channel (PUSCH), the UE may try to use the entire scheduled BW for the encoding of the PUSCH. The UE may then puncture the data that is mapped to LBT BW where CCA is not successful. For uplink (UL), the number of phases (two, as shown in FIG. 6) can be limited instead to just one phase and only puncturing can be applied for the LBT BW where CCA is not successful during the entire COT duration.

In other embodiments, as allowed by the regulatory requirements, a primary channel is defined, the selection of the primary channel can be left to the gNB's implementation. In other embodiments, the primary channel can be chosen uniformly among a raster of available channels or the primary channel can be fixed. In this context, the GC-PDCCH that carries the indication of the LBT BW may always be carried within the primary channel and may not be prepared in the beginning of the gNB acquired COT. In this case, the DL transmission over the active BWP may always be conditional to the success of the LBT over the primary channel. A UE may always expect transmission over the primary channel. The UE performs blind detection to determine the primary channel if the primary channel is not known a priori (which may be for the first downlink (DL) burst), the UE performs blind detection to determine the primary channel; in all the subsequent DL bursts, the primary channel may always be located on the same channel. While regulatory requirements only dictate that the primary channel cannot be changed more than once a second, this does not limit the amount of time the same channel can be used as a primary channel.

Thus, the UE behaviour in this case is as follows: in phase 1 the UE attempts to find the primary channel by detecting the DMRS and/or decoding the GC-PDCCH, unless the primary channel is known a priori or has been already detected in a prior DL burst. If the primary channel is known a priori or has been already detected in a prior DL burst, the UE can simply decode the GC-PDCCH without any blind detection and can extract the information related to the LBT BW. In phase 2, once the LBT BW is known, the UE can perform radio frequency (RF) retuning and decode the information over the intended activated BWP.

Note that as used herein, each instance of transmission of a signal (e.g., GC-PDCCH, PDSCH) by a transmitting entity (e.g., gNB) may first be encoded for transmission. Similarly, the receiving entity (e.g., UE) may decode the signal after reception before further processing.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a User Equipment (UE) configured for operation in a fifth-generation new radio (5G NR) network, the apparatus comprising: processing circuitry; and memory,
   wherein for shared spectrum channel access, the processing circuitry is configured to:
   decode a downlink control information (DCI) format 2_0 with cyclic redundancy check (CRC) scrambled by a Slot Format Indicator—Radio Network Temporary Identifier (SFI-RNTI), the DCI format 2_0 received from a generation Node B (gNB) on a channel during a channel occupancy obtained by the gNB, the DCI format 2_0 notifying the UE of a slot format, a channel occupancy time (COT) duration and an available resource block (RB) set indicator for performing a channel access procedure in shared spectrum,
   wherein the available RB set indicator comprises a bitmap, each bit of the bitmap indicating whether an RB set remains available or unavailable until an end of a remaining channel occupancy, and
   wherein the slot format is indicated by a Slot Format Indicator (SFI) index field indicating one or more slot formats;
   determine a duration in time domain and a location in frequency domain of a remaining of the channel occupancy obtained by the gNB based, respectively, on the COT duration and the RB sets that are indicated to remain available by the bitmap; and
   perform a channel access procedure for an uplink (UL) transmission on the RB sets that are indicated to remain available within the duration and location of the remaining channel occupancy,
   wherein the memory is configured to store the DCI format 2_0.

2. The apparatus of claim 1, wherein the channel access procedure comprises the UE sensing the channel to be idle within a sensing slot for a duration following the sensing slot.

3. The apparatus of claim 2, wherein the channel comprises one or more RBs of an RB set that is indicated as remaining available.

4. The apparatus of claim 3, wherein when the channel is determined to be idle within the sensing slot for the duration, the processing circuitry is to configure the UE to transmit the UL transmission within the duration and location of the remaining channel occupancy obtained by the gNB.

5. The apparatus of claim 4, wherein the processing circuitry is to configure the UL transmission to have a transmission bandwidth within a downlink bandwidth part (DL BWP) of the remaining channel occupancy.

6. The apparatus of claim 5, wherein the processing circuitry is further configured to:
   decode radio resource control (RRC) signalling comprising a search space information element (IE) indicating a search space, and control resource set (CORESET) IE configuring the UE with a CORESET for the search space.

7. The apparatus of claim 6, wherein the processing circuitry is to further configure the UE to search the search space based on the CORESET for physical downlink control channel (PDCCH) candidates to decode the DCI format 2_0.

8. The apparatus of claim 7, wherein the DCI format 2_0 is received in one of the PDCCH candidates via UE group common signalling.

9. The apparatus of claim 4, wherein the channel is a shared channel in unlicensed spectrum.

10. The apparatus of claim 9 wherein the UL transmission is a physical uplink shared channel (PUSCH) transmission.

11. A non-transitory computer-readable storage medium that stores instructions for execution by processing circuitry of a User Equipment (UE) configured for operation in a fifth-generation new radio (5G NR) network, wherein for shared spectrum channel access, the processing circuitry is configured to:
   decode a downlink control information (DCI) format 2_0 with cyclic redundancy check (CRC) scrambled by a Slot Format Indicator—Radio Network Temporary Identifier (SFI-RNTI), the DCI format 2_0 received from a generation Node B (gNB) on a channel during a channel occupancy obtained by the gNB, the DCI format 2_0 notifying the UE of a slot format, a channel occupancy time (COT) duration and an available resource block (RB) set indicator for performing a channel access procedure in shared spectrum,
   wherein the available RB set indicator comprises a bitmap, each bit of the bitmap indicating whether an RB set remains available or unavailable until an end of a remaining channel occupancy, and
   wherein the slot format is indicated by a Slot Format Indicator (SFI) index field indicating one or more slot formats;
   determine a duration in time domain and a location in frequency domain of a remaining of the channel occupancy obtained by the gNB based, respectively, on the COT duration and the RB sets that are indicated to remain available indicated by the bitmap; and
   perform a channel access procedure for an uplink (UL) transmission on the RB sets that are indicated to remain available within the duration and location of the remaining channel occupancy.

12. The non-transitory computer-readable storage medium of claim 11, wherein the channel access procedure comprises sensing, by the UE, the channel to be idle within a sensing slot for a duration following the sensing slot.

13. The non-transitory computer-readable storage medium of claim 12, wherein the channel comprises one or more RBs of an RB set that is indicated as remaining available.

14. The non-transitory computer-readable storage medium of claim 13, wherein when the channel is determined to be idle within the sensing slot for the duration, the processing circuitry is to configure the UE to transmit the UL transmission within the duration and location of the remaining channel occupancy obtained by the gNB.

15. The non-transitory computer-readable storage medium of claim 14, wherein the processing circuitry is to configure the UL transmission to have a transmission bandwidth within a downlink bandwidth part (DL BWP) of the remaining channel occupancy.

16. The non-transitory computer-readable storage medium of claim 15, wherein the processing circuitry is further configured to:
  decode radio resource control (RRC) signalling comprising a search space information element (IE) indicating a search space, and control resource set (CORESET) IE configuring the UE with a CORESET for the search space.

17. The non-transitory computer-readable storage medium of claim 16, wherein the processing circuitry is to further configure the UE to search the search space based on the CORESET for physical downlink control channel (PDCCH) candidates to decode the DCI format 2_0.

18. The non-transitory computer-readable storage medium of claim 17, wherein the DCI format 2_0 is received in one of the PDCCH candidates via UE group common signalling.

19. An apparatus for generation Node B (gNB) configured for operation in a fifth-generation new radio (5G NR) network, the apparatus comprising: processing circuitry; and memory,
  wherein for shared spectrum channel access, the processing circuitry is configured to:
  encode a downlink control information (DCI) format 2_0 with cyclic redundancy check (CRC) scrambled by a Slot Format Indicator—Radio Network Temporary Identifier (SFI-RNTI), the DCI format 2_0 for transmission to a user equipment (UE) on a channel during a channel occupancy obtained by the gNB, the DCI format 2_0 notifying the UE of a slot format, a channel occupancy time (COT) duration and an available resource block (RB) set indicator for performing a channel access procedure in shared spectrum,
  wherein the available RB set indicator comprises a bitmap, each bit of the bitmap indicating whether an RB set remains available or unavailable until an end of a remaining channel occupancy, and
  wherein the slot format is indicated by a Slot Format Indicator (SFI) index field indicating one or more slot formats;
  decode an uplink (UL) transmission from the UE within a duration in time domain and a location in frequency domain of a remaining portion of the channel occupancy, the duration and location of the remaining portion of the channel occupancy is based on the COT duration and the RB sets that are indicated to remain available indicated by the bitmap,
  wherein the memory is configured to store the DCI format 2_0.

20. The apparatus of claim 19, wherein the channel comprises one or more RBs of an RB set that is indicated as remaining available and the UL transmission has a transmission bandwidth within a downlink bandwidth part (DL BWP) of the remaining portion of the channel occupancy.

* * * * *